United States Patent [19]

Molby

[11] 4,271,918

[45] Jun. 9, 1981

[54] HYDROSTATIC VARIABLE RATIO CONTROL SYSTEM

[76] Inventor: Lloyd A. Molby, Box 7788, Longview, Tex. 75602

[21] Appl. No.: 950,403

[22] Filed: Oct. 11, 1978

[51] Int. Cl.³ .................... B60K 26/02; G05G 7/04
[52] U.S. Cl. .................. 180/6.48; 74/474; 74/481; 74/518; 74/522; 180/315
[58] Field of Search ............ 180/49, 6.48, 77 R, 180/77 H, 315; 74/474, 481, 516, 518, 522

[56] References Cited

U.S. PATENT DOCUMENTS

| | | | |
|---|---|---|---|
| 3,237,478 | 3/1966 | Jewell | 74/482 |
| 3,316,773 | 5/1967 | Findlay | 74/481 |
| 3,525,266 | 8/1970 | Brooks et al. | 74/481 |
| 3,535,951 | 10/1970 | Larson et al. | 74/482 |
| 3,537,328 | 11/1970 | Allen | 74/481 |
| 3,541,878 | 11/1970 | Haffner | 74/474 |
| 3,611,827 | 10/1971 | Bottum | 180/6.48 |
| 3,666,034 | 5/1972 | Stuller et al. | 180/6.48 |
| 3,792,744 | 2/1974 | Gray | 180/6.48 |
| 3,876,020 | 4/1975 | Barsby | 180/77 H |
| 4,011,768 | 3/1977 | Tessenske | 74/481 |

Primary Examiner—John J. Love
Assistant Examiner—Donn McGiehan
Attorney, Agent, or Firm—Wofford, Fails & Zobal

[57] ABSTRACT

This specification discloses an off-road vehicle employing an improved hydrostatic drive system including engine driven variable displacement pumps having respective actuating members for varying displacement in two directions equivalent to forward and reverse directions, wheel motors at each wheel representing hydraulic actuating device operable by the fluid from the pump, hydraulic reservoir, serially interconnecting supply and return lines, and an improvement comprising one or more operator control members and a sensitivity control means for controlling the range of movement of the actuating member responsive to movement of the operating control member in a respective direction. Also disclosed is a preferred embodiment in which four wheel hydrostatic drive is employed with an option of converting the hydraulic fluid output that normally goes to one set of wheels such that all of the fluid goes to the other set of wheels for road speed operation. Also disclosed are the details of preferred structural embodiments.

6 Claims, 8 Drawing Figures

HYDROSTATIC VARIABLE RATIO CONTROL SYSTEM

BACKGROUND OF THE INVENTION

1. Field of the Invention

This invention relates to a vehicle of the so called off-road type. More particularly, this invention relates to an improved hydrostatic drive system that can be employed for motive power for the off-road vehicle and provide a wide range of sensitivity and speed options for the operator.

2. Description of the Prior Art

A wide variety of off-road type vehicles have been known in the prior art. Each type of vehicle has been expensive and not used fully, since it was ordinarily connected with a particular type of attachment. As described in my co-pending application entitled "Adaptable Combination of Vehicle and Attachments", Ser. No. 919,179, filed June 26, 1978, now U.S. Pat. No. 4,222,186, there is provided an adaptable expensive vehicle that can be used with a wide variety of attachments such as augers, dump beds, ditch digging equipment, back hoes, revolving jib cranes, fork lifts and the like to more fully utilitize the vehicle. In my co-pending application entitled "Off-road Vehicle that both Oscillates and Articulates," Ser. No. 934,586, filed Aug. 17, 1978, there was described improvement in which the vehicle both oscillated and articulated to afford a high degree of maneuverability, ease of steering and provide a substantially level platform for operation of the attachments. In my co-pending application entitled "Hydrostatic System with Over-Control Compensation," Ser. No. 950,404, filed Oct. 11, 1978 now U.S. Pat. No. 4,215,547, there was disclosed an improved hydrostatic drive system in which over control compensation was provided by means for moving an actuating member back toward a neutral position. The descriptive matter of all these applications are incorporated herein by reference for details that are omitted herefrom. These inventions represent significant advances in the art but still fail to provide totally satisfactory off-road vehicle with a hydrostatic drive system, since there was a propensity to over control such that the operator could not easily control the vehicle in rough terrain or the like if operating at the high speeds commensurate with traveling a relatively smooth road or open path.

The prior art has seen the development of other attempts to provide this sensitivity. U.S. patents such as the following illustrate the state of the art technology. U.S. Pat. No. 3,237,478 discloses an accelerator linkage including a motion cancelling mechanism so as to allow relative movement between the chassis and the vehicle motor without "hunting" of engine speeds. U.S. Pat. No. 3,316,773 describes foot and hand levers for neutral, forward and reverse positions and for various pump displacements therewithin. The hand control establishes forward and reverse ranges but not sensitivity. One of the more important patents is U.S. Pat. No. 3,525,266 which provides variable speed ranges for forward and reverse accelerator pedals but is a more complex invention that ensures that the transmission is in neutral when it is supposed to be. The disclosed invention has a link to determine the speed ratio of the transmission. U.S. Pat. No. 3,535,951 describes a hand lever for setting the primary or minimum speeds; a foot override is provided; but counterweights and shock absorbers prevent temporary overriding from lowering the hand lever setting upon rebound as in the prior art. U.S. Pat. No. 3,537,328 describes hand and foot controls wherein the hand control in neutral and the foot control in forward position will cause an advance at a speed proportional to a degree of movement of the pedal. The foot pedal also increases and decreases the speed of the hand setting. U.S. Pat. No. 3,541,878 automatically sets the neutral position. A spring opposes the manual setting to resist the tendency to increase the speed in a given direction.

From the foregoing, it can be seen that the prior art has not been totally satisfactory in providing a simple, economical sensitivity control on a hydrostatic system having a pump driving a variable displacement pump with an actuating member driving an actuatable device. More specifically, the prior art has not been satisfactory in providing an off-road vehicle driven by hydrostatic system in which a one or more variable displacement pumps drive constant displacement wheel motors and in which the operator can select sensitivity for the particular terrain or operating conditions.

SUMMARY OF THE INVENTION

Accordingly, it is an object of this invention to provide an improved hydrostatic system in which one or more variable displacement pumps having respective actuating members drive hydraulically actuatable device and incorporating improvement of an operator control member with a sensitivity control means for selecting the sensitivity of control.

It is a specific object of this invention to provide an adaptable off-road vehicle powered by a hydrostatic system having one or more variable displacement pumps with respective actuating members and hydraulic motors providing wheel drives and driven by the pump in which the operator can select the sensitivity in order to compensate for the respective operating conditions, yet allow full stroking of the one or more operators control members.

These and other objects will become apparent from the descriptive matter hereinafter. Particularly when taken in conjunction with the appended drawings.

In accordance with this invention there is provided, as for driving an off-road vehicle, a hydrostatic system having at least one variable displacement pump having an actuating member for varying displacement in at least one direction; a hydraulically actuatable device operable by a hydraulic fluid from the pump; a hydraulic reservoir; serially interconnecting supply and return lines; and an improvement comprising at least one operator control member for moving the actuating member and a sensitivity control means for controlling the degree of movement of the actuating member responsive to full movement of the operator control member such that the operator can control the sensitivity for given operating conditions.

In accordance with another embodiment of this invention, there is provided both a separate sensitivity control member and a road speed member for providing both sensitivity of control of the operating pedals and for higher speed for travel on relatively smooth surfaces, such as roads.

In accordance with specific embodiments of this invention, there are provided operators forward and reverse pedals for controlling the respective one or more pumps supplying the high pressure hydraulic fluid to the wheel motors, the pedals being interconnected such that only one pedal at a time is operable and the sensitivity control means controls the sensitivity for each of the pedals regardless which is operative.

DESCRIPTION OF THE PREFERRED EMBODIMENTS

Figure 1:
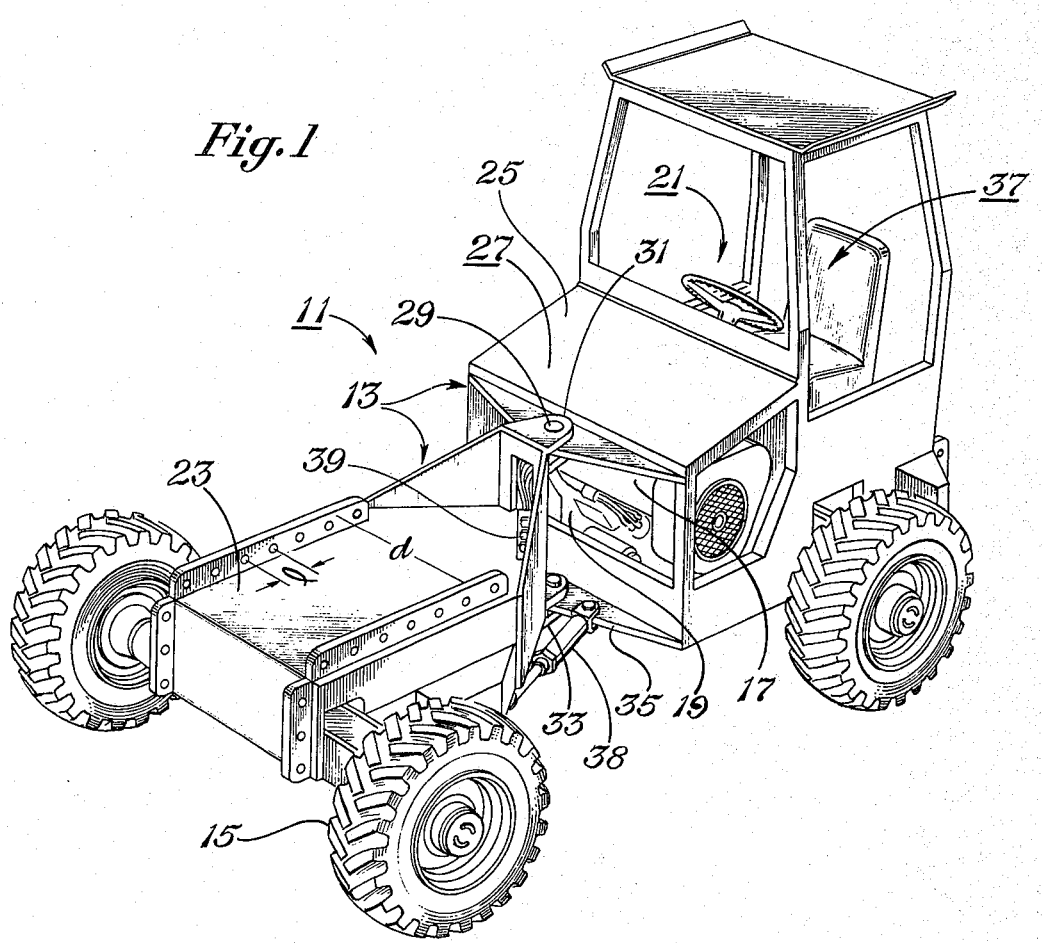
FIG. 1 is an isometric view of an adaptable off-road vehicle employing the hydrostatic system in accordance with this invention.

This invention can be understood more clearly by referring to the figures in conjunction with the following descriptive matter. The hydrostatic system of this invention may be employed in a wide variety of embodiments and environments. One particular environment in which it is advantageous is in the off-road vehicle type environment; and that is the environment in which it will be described herein. Referring to FIG. 1, an adaptable off-road vehicle 11 has its frame 13 mounted on wheels 15. The frame 13 carries a prime mover 17 for powering the vehicle 11 and driving a power means, or power source, 19 for power in operating respective attachments. A steering means 21 is provided for steering the vehicle.

Vehicle 11 comprises a front section 23 and a rear section 25. The vehicle 11 in the illustrated embodiment is an articulated embodiment, articulating about a central vertical axis 27. The axis 27 comprises a plurality of pins 29 inserted through respective apertures 31 in the respective clevices emplaced over the steering lug 35 with the apertures in alignment for receiving the pins 29.

The frame 13 is formed of suitably strong structural materials, such as steel or the like, that has been welded into place to support the respective elements in accordance with conventional engineering technology in this art. The rear section 25 encloses the operators console 37 having usual controls, seat and the like.

The respective wheels 15 may comprise any of the usual types of wheels. As illustrated, they include hydraulic motor driven wheels with tires around the periphery. The hydraulics are connected with suitable controls, pump and reservoir in a hydrostatic system having at least conventional forward and rearward operating capability. The four wheels 15 are employed for supporting in a very stable manner each of the four corners of the frame 13.

The prime mover 17 is an internal combustion engine; specifically, a diesel in the illustrated embodiment. It drives the power means which comprises a pair of hydraulic pumps supplying high pressure hydraulic fluid for the hydrostatic drive system. It drives the pumps for a separate hydraulic system for powering the respective attachments.

Steering means 21 comprises the usual steering wheel and hydraulic ram, such as ram 38, that is fluidly connected with the steering means 21 and operable to effect articulation of the frame 13 about the central vertical axis 27.

Expressed otherwise, the basic vehicle 11 is a tractor that has a four-wheel drive, an articulated power unit and is adapted to use remotely operated, hydraulically powered tools, or attachments, whether they are fastenable to the machine or used remotely therefrom. The hydraulic power unit can accommodate high pressure circuits of from 2 gallons a minute up to 8 gallons a minute on one auxiliary system and 6 gallons a minute to 26 gallons a minute in the main hydraulic circuits for driving the attachments. The vehicle 11 has a plug-in quick-connect hydraulic circuit fittings 39 that enable the hydraulic lines on the respective attachments to be plugged in, in the same way that an electric cord may be plugged into a wall socket. The respective receptacles and plugs have respective valves immediately adjacent the ends for preventing unwanted flow when the fittings are unplugged. This facilitates hydraulic interconnection of the respective attachments such that both they and the hydraulic circuits on the vehicle remain filled with hydraulic fluid.

The illustrated embodiment of the vehicle is available in either standard or heavy duty versions. The vehicle will handle up to about 5,000 pounds on the fork lift attachment. As illustrated, the wheels on the heavy duty version employ tires that are 19 inches wide. The vehicle steers 90° total articulation, 45° on either side of the longitudinal axis of the aligned sections.

Figure 2:
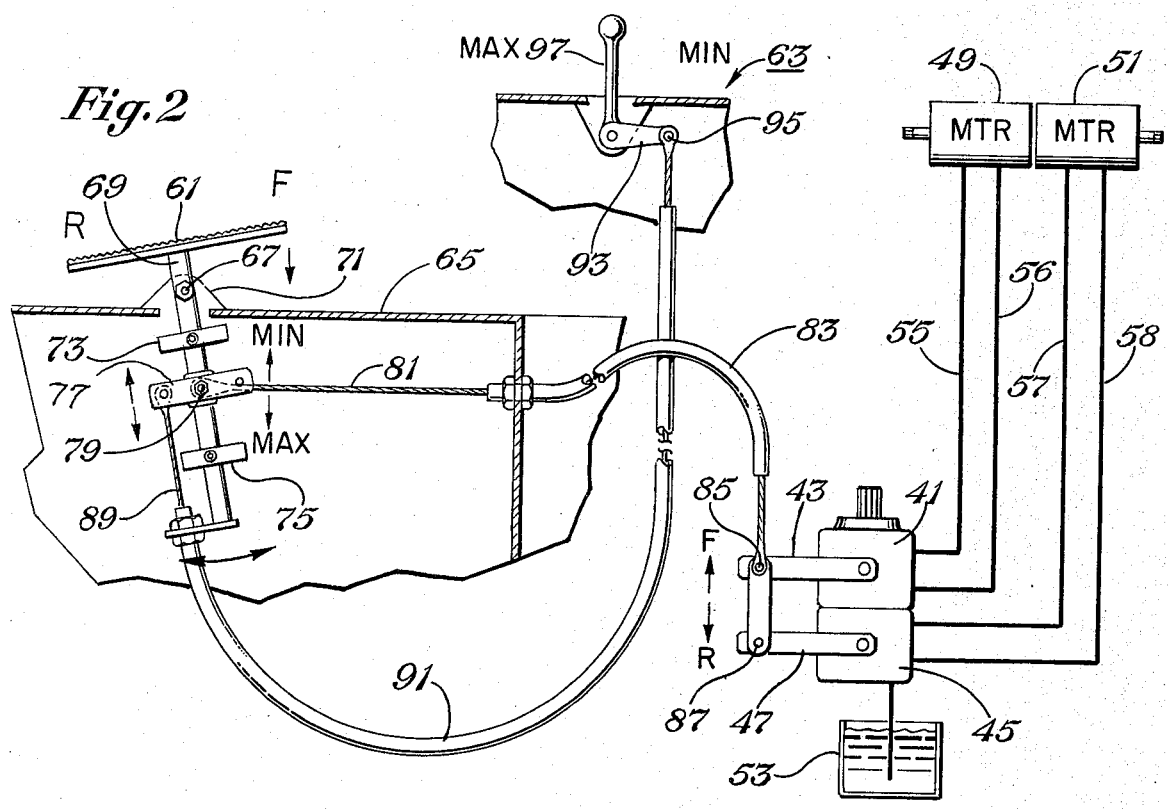
FIG. 2 is a schematic view of a variable ratio control system in accordance with this invention.

It is believed helpful to consider a hydrostatic system of this invention in a generalized application as shown schematically in FIG. 2. Therein, there is at least one variable displacement pump 41 having an actuating member 43 for varying displacement in at least one direction. As illustrated, there is a pair of pumps 41, 45, each having their own actuating members 43, 47 and movable in both forward and reverse directions, shown by the arrows F and R. The hydrostatic system includes a hydraulically actuatable device, such as motors 49, 51 operable by the fluid from the pump, a hydraulic reservoir 53, and respective serially interconnecting supply and return lines 55–58. If desired, the respective motors 49, 51 may have case drain lines that return fluid to the reservoir, directly or by way of a cooler.

The hydrostatic system includes at least one operator control member, such as pedal 61 for moving the actuating member responsive to an operator; and a sensitivity control means 63 for controlling sensitivity of the operator control member.

The pumps 41 and 45 may have any capacity of from 2 gallons up to 30 gallons per minute or more. The pumps are designed to supply high pressure hydraulic fluid up to the pressure that is necessary to operate the system. This may range from as little as a hundred pounds per square inch gauge (psig) to as much as 5,000 psig or more. The pumps are variable displacement such that as the actuating member is moved in a particular direction, the output of the pump is increased. Typically the commercially available pumps are those employing wobble plates with positive displacement means, such as pistons in cylinders. As the cylinder group and wobble plate are rotated, the displacement is zero at zero displacement of the wobble plate. As the wobble plate is tilted, or canted, at an increasing angle, the displacement increases in a respective direction. These type variable displacement pumps are commercially available from manufacturers such as Sundstrand and the like.

The actuatable devices are also commercially available. In the illustrated example, the motors 49, 51 are constant displacement devices such that their speed of rotation is proportional to the hydraulic output from the respective pumps 41, 45. Again the motors may be obtained from the same manufacturer that manufacturers the pumps if desired and matched for the same pressure range of operation, as well as the flow rate range of operation. The motors are connected by their respective shafts and conventional gearing to drive the respective wheels on the vehicle 11, FIG. 1.

The hydraulic reservoir 53 is simply an accumulator that may comprise any container such as a stamped steel container for holding the excess hydraulic fluid. The pumps 41 and 45 may take suction directly from the reservoir 53 or be supplied by a charge pump as desired. In the enclosed system, the fluid that is sent out by one supply line, as line 55, 57, for reverse operation, is returned in the return lines 56, 58. On the other hand, the return lines 56, 58 become supply lines when forward operation is signaled by moving actuating members in the opposite direction. In any event, the system remains completely charged with the non expanding hydraulic fluid such that only a small quantity of hydraulic fluid need be made up to the pumps to compensate fo case drain leakage. The respective supply and return lines 55-58 are high pressure hoses and respective fitting and tubing interconnects to withstand the design pressure of the system. If desired, as described in my co-pending application Ser. No. 950,404, suitable relief valves may be provided on the lines and connected with neutralizing means for neutralizing the actuating members 43, 47.

The operator control member 61 may comprise any suitable controls ordinarily employed with these hydrostatic systems. Such controls include lever and cable arrangements, lever and solid rod arrangements and, as indicated a pivotally mounted pedal 61 with suitable cable and sheath arrangement. As illustrated in FIG. 2, the pedal 61 is pivotally mounted on a floor board 65 for pivotal movement about a fulcrum pin 67 penetrating through the main shaft 69 and mounting brackets 71. Slidably connected with the shaft 69 intermediate stops 73, 75 is connector 77. The connector 77 is connected by fulcrum pin 79 with cable 81 that is slidably enclosed within mounted sheath 83. At its other end, the cable 81 is connected, as by fulcrum pins 85, 87 with the actuating members 43, 47. Thus, as the pedal 61 is depressed at its bottom in the rearward direction, there is pivotal movement moving the cable 81 to the right at the connector 77 and downwardly where it is connected with the actuating members 43, 47. This effects reverse rotation of the motors 49, 51. Conversely, downward movement of the top forward section (F) moves the cable to the left and the actuating members upwardly in the forward direction moving the motors (mtr) 49, 51 in the forward direction.

The sensitivity, or amount of movement of the actuating members 43, 47 is controlled by the distance the connector 77 is from the fulcrum pin 67 along the shaft 69. Accordingly, the sensitivity control means 63 has a cable 89 that is connected with the connector 77 for moving it longitudinally of the main shaft 69. The cable 89 fits slidably within the sheath 91 and is connected with link 93 of the operators control lever 97 at fulcrum pin 95. The lever 93 is connected with the operators control lever 97 for controlling the sensitivity as desired. The levers 93 and 97 may be a bell crank or adjustably connected together. In any event they formed a unitary control that is pivotally movable about fulcrum shaft 96. For example, as indicated, for maximum movement, the lever is pulled to the left (max), moving the connector 77 downwardly to stop 75 for the greatest degree of movement in respective direction responsive to full movement of operators pedal 61. Conversely, as for operating a vehicle in rough terrain, the operator may move the operators control lever 97 to the right to minimum movement, moving the connector 77 to stop 73, closest to the fulcrum shaft 67. This effects the least amount of movement. Of course, detents or other holding means may be employed to control the operators control lever 97 at preset sensitivity levels for sustained operation without it moving inadvertently.

In operation, it can be seen that the operators control lever may be moved to any position between maximum and minimum to slide the connector 77 between the stops 73 and 75 to have any desired sensitivity. Expressed otherwise, at stop 73 the sensitivity is at the minimum and the amount of movement of the actuating member 43, 47 is the smallest for full pedal travel in the respective direction. Conversely, for greatest speed, or control movement of the operating members 43, 47, the connector 77 is moved to a stop 75. In this mode, there is the most sensitive operation, since the small amount of movement of the pedal results in a large amount of movement of the actuating members 43, 47.

Figure 3:
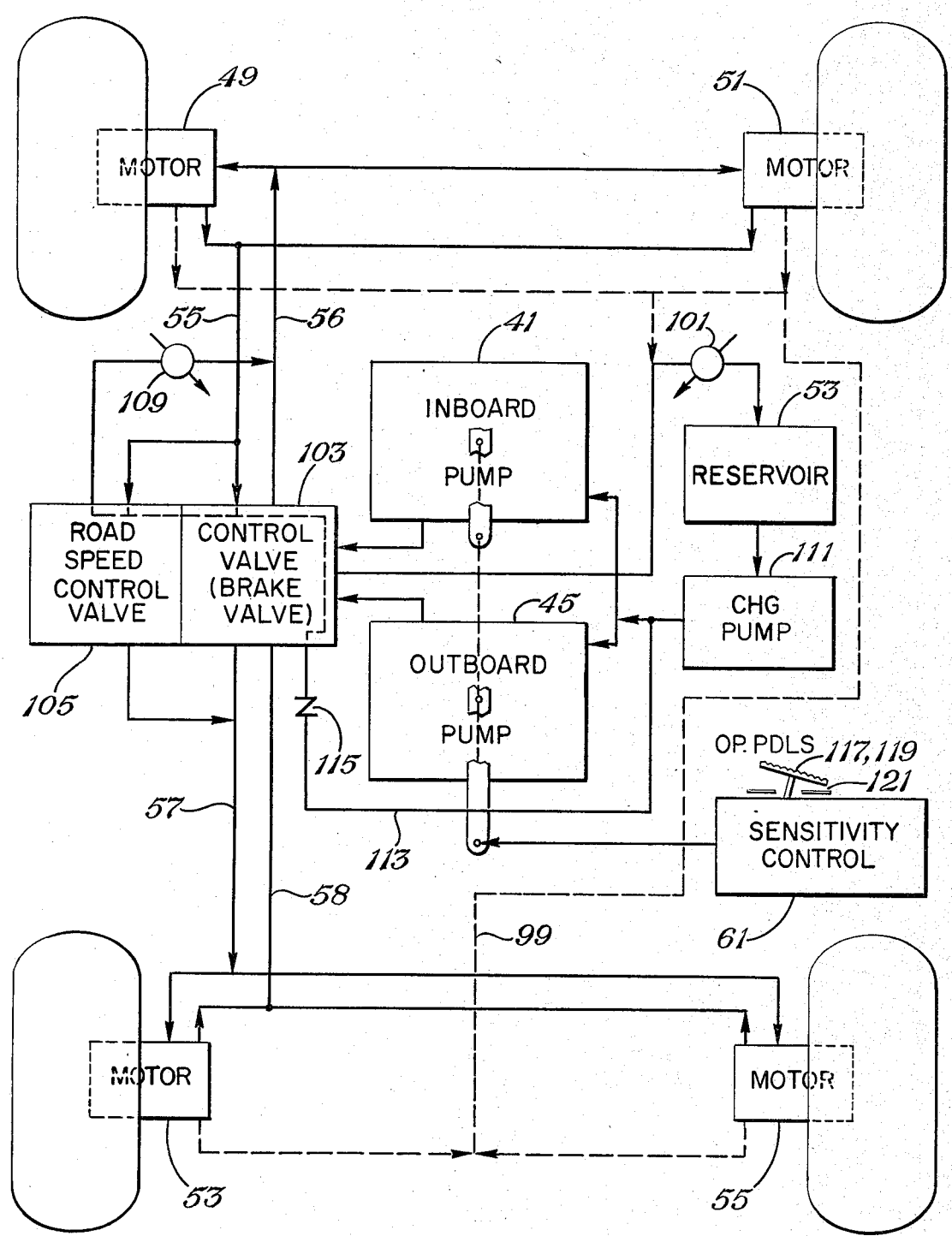
FIG. 3 is a schematic view of the hydrostatic system employed in the vehicle of FIG. 1.

Referring to FIGS. 3-8, there is illustrated an embodiment of this invention employed on the vehicle 11, FIG. 1. To assist in understanding, numbers will be employed that are the same as in the previously delineated embodiment in FIG. 2. Referring to FIG. 3, the pumps 41, 45 and suitable control valve are interconnected via supply and return lines 55-58 with respective motors 49, 51 and rear motors 53, 55. A case drain line 99 is connected with the cases of the motors for venting the leaking hydraulic fluid back through cooler 101 to reservoir 53. The control valve 103 is employed, in conjunction with road speed control valve 105, to effect flow to both sets of motors, or, at the instance of the road speed control valve operation, to the rear motors only for highway speed operation. Specifically, the control valve 103 directs, in normal operation, the output of the high pressure hydraulic fluid from the inboard pump 41 to the front wheel motors 49, 51 through lines 55, 56 and the output from out-board pump 45 to the rear motors 53, 55 through the lines 57 and 58 for the respective forward and reverse directions of flow. On operation of the road speed control valve 105, as by the operator pulling out road speed lever 107, FIG. 4, the hydraulic fluid in the motors 49, 51 is simply recirculated so that they are free wheeling and the output from both pumps is sent to the rear motors 53, 55. If desired, the hydraulic fluid that is free wheeling in the motors 49, 51 may be passed through a cooler 109 to prevent heating. Ordinarily, the cooler is not necessary since the case drain fluid is passed through the cooler 101 to the reservoir 53 and charge fluid is made up through charge pump 111 and sent by line 113 to make up the fluid loss with cooler fluid. A check valve 115 prevents reverse flow from the control valve 103.

Charge pump 111 also makes up fluid to the inboard and outboard pumps 41, 45 to prevent cavitation because of the leakage to the case drain lines.

Figure 4:
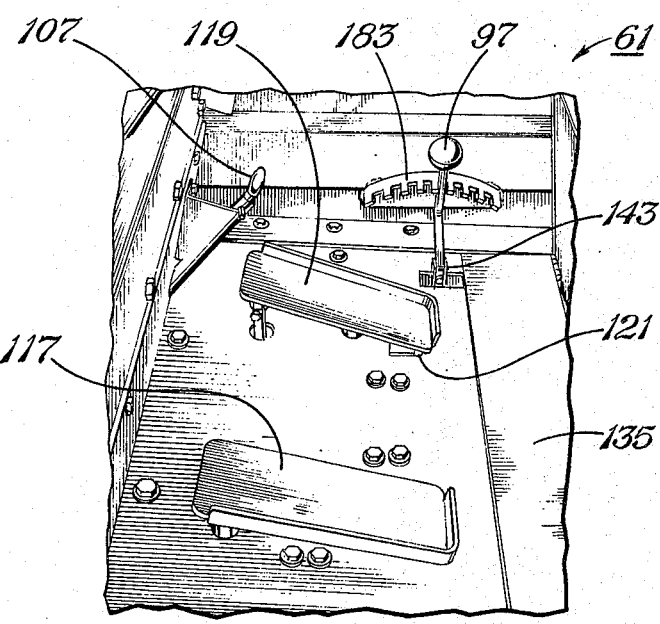
FIG. 4 is a perspective view of the pedals, sensitivity control lever and road speed member shown on the floor board of the vehicle of FIG. 1.
Figure 6:
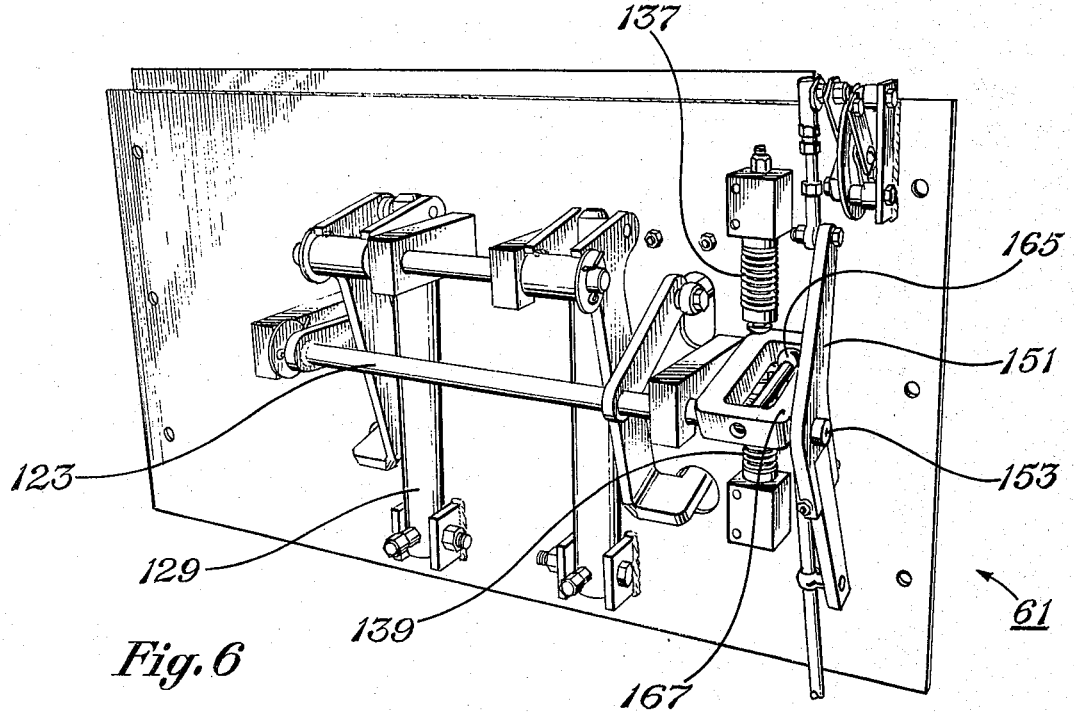
FIG. 6 is a partial bottom view of the floor board having the sensitivity control means shown in part.
Figure 7:
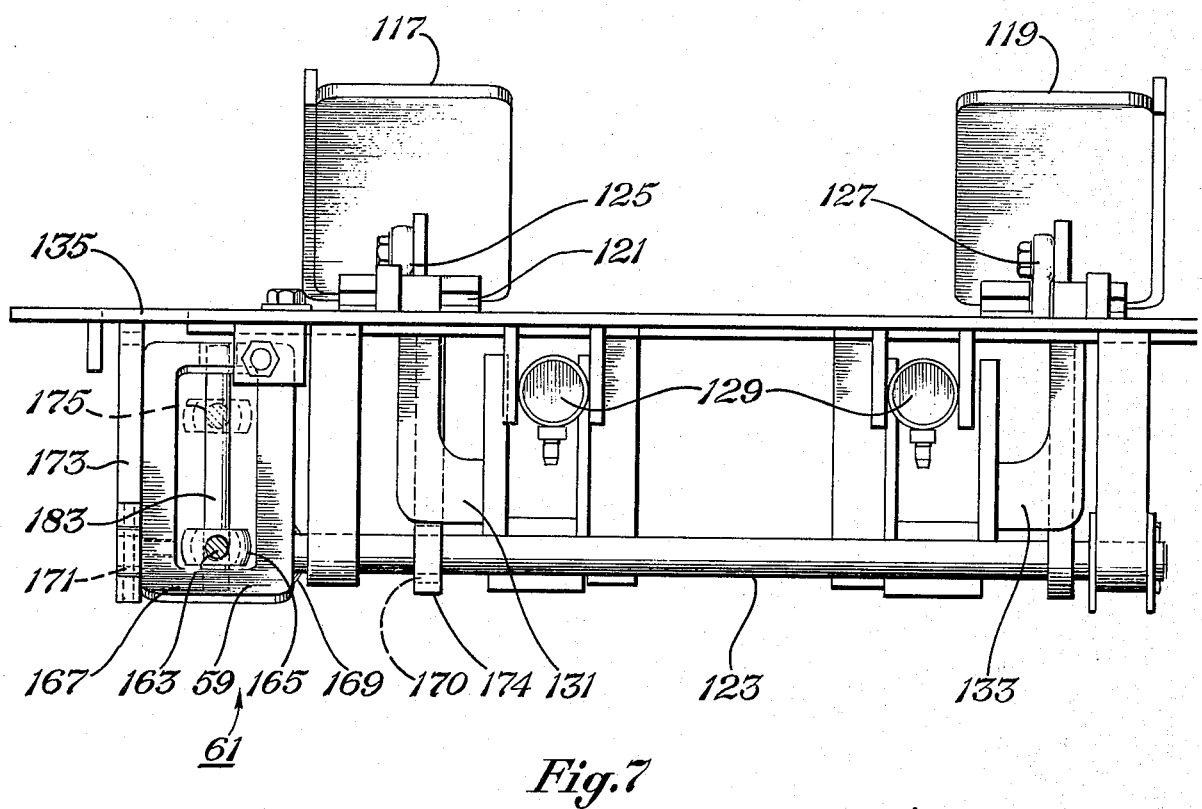
FIG. 7 is a partial rear view of the floor board showing the pedals, control shaft and a part of the sensitivity control means.

In this embodiment, there are a pair of operator control pedals 117, 119, FIGS. 3, 4, and 7. The pedals are pivotally mounted for movement about the fulcrum shaft 121. Each of the pedals 117, 119 is connected with a control shaft 123, FIGS. 5-7, by a suitable linkages 125, 127. As described in my co-pending application Ser. No. 950,404 respective linkages are off set such that the depression of one pedal causes the control shaft 123 to be operated in the forward direction whereas depression of the other pedal causes the control shaft 123 to be operated in the reverse direction. Because of the direct linkage interconnection only one pedal can be depressed at a time. Moreover, because of the off set angles, as described in application Ser. No. 950,404 the pedals are moved upwardly from the neutral position only a predetermined proportion, such as one-half, as much as the opposing pedal is moved downwardly from the neutral position to impart the desired direction to the vehicle. This allows comfort to the operator. Moreover, suitable hydraulic rams 129 are employed as emergency overrides to restore the respective pedals to neutral in the event there is relieving of hydraulic fluid by the relief valves (not shown). Specifically, the hydraulic rams are connected with respective bell cranks 131, 133 that are pushed upwardly to the limit allowed by the floor board 135 to restore each respective pedal to neutral.

Figure 5:
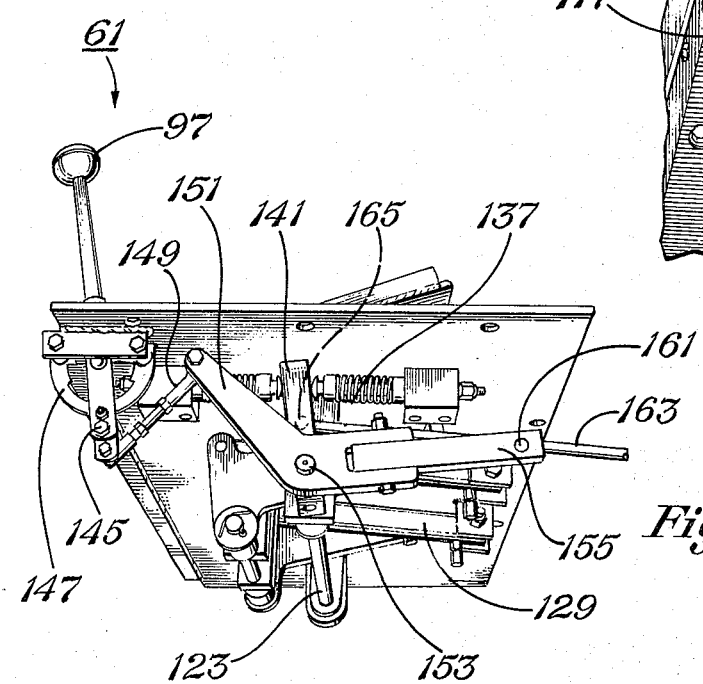
FIG. 5 is a partial perspective view from beneath the floor board, from the right hand side, showing the sensitivity control means.
Figure 8:
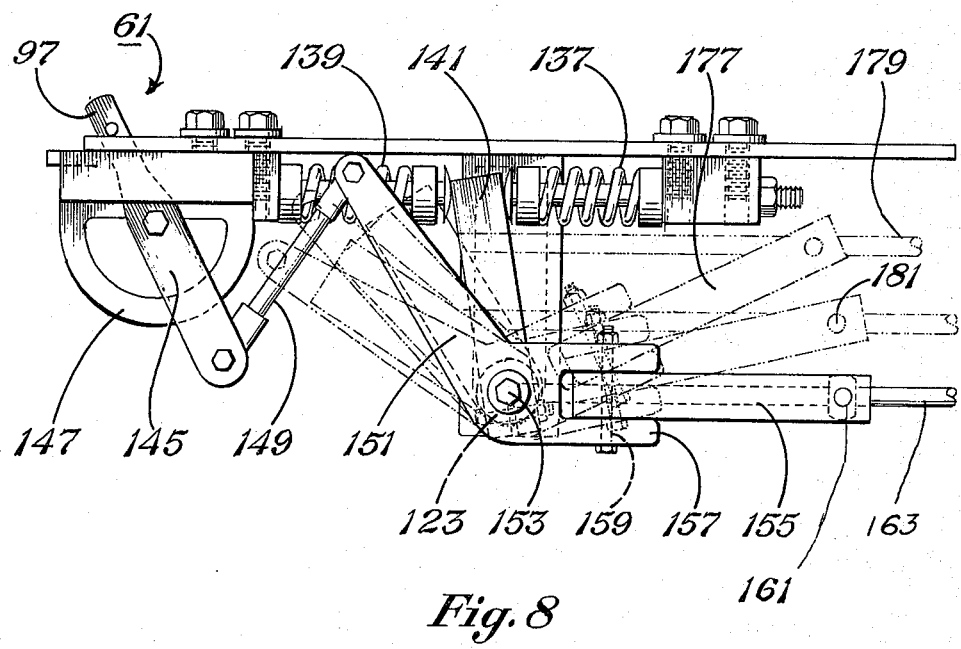
FIG. 8 is a partial side elevational view showing the floor board and a part of the sensitivity control means.

Neutralizing springs 137, 139, FIGS. 5, 6 and 8, restore the pedals to the neutral position when the pedals are released. Specifically, the springs act on lever 141 that rotates the shaft 123.

The sensitivity control means 61, FIGS. 3–8 includes the operators control lever 97, FIGS. 4, 5 and 8 that is pivotally mounted at a bracket 143 on the floor board 135. The operator control lever 97 extends below the floor board at a downwardly extending member 145, FIGS. 5 and 8. Smooth arcuate movement of the downwardly extending portion 145 is ensured by the arcuate member 147, FIG. 8. The downwardly extending portion 145 is connected by link 149 with a bell crank 151. Suitable pivot pin interconnections are provided at the respective joinders so as to provide pivotal movement. The bell crank 151 is pivotally mounted for movement about its fulcrum shaft 153. The bell crank 151 carries an extending linear sector 155 that is pivotally mounted in the bifurcated end 157 about a bolt 159, FIG. 8. At its other end, the extending sector 155 is connected as by fulcrum pin 161, with a control rod 163.

The control rod 163 is connected at one end with the respective actuating members, or stroking members, for stroking the hydraulic pumps 41, 45; so it is moved in an arcuate movement at that end. At its other end, the rod 163 has a spherically shaped ball end 165, FIG. 7, that is slidably mounted on the O-shaped lever 167. Preferably, the spherical rod end 165 has a range of movement to accommodate vertical movement within the O-shaped lever 167 and about a linear member 183. The linear member may be a bolt or a pin. This type of structural spherical rod end allows twist through the movement of the control rod 163 in moving the actuating members on the pumps 41, 45 without binding movement of either the sensitivity control or the pedals and control shaft 123. The spherical rod end becomes, in effect, a spherical bearing that creates alignment regardless of the angle to which the respective linkages are pivoted. The O-shaped lever 167 is mounted on the control shaft 123 so as to pivot in unison with the control shaft 123. Specifically, the illustrated O-shaped lever 167 is connected by welded connection 169 with the control shaft 123. The control shaft 123 and O-lever 167 are journalled for rotation, or pivotal movement, in bushings 170 and 171 in brackets 173 and 174. Accordingly, the O-shaped lever 167 rotates, or pivots, as the control shaft 123 pivots responsive to movement of the respective pedals. As can be seen, when the rod end 165 is in the bottom position as illustrated in FIG. 7, there is zero movement of the rod 163 responsive to rotation of the control shaft 123. Accordingly, at the zero position, there is zero sensitivity, since there is no control movement of the pump actuating member, even with full movement of the pedals. Conversely, when the spherical rod end 165 is moved to the top, shown in dashed lines 175, there is maximum movement of the rod 163 and hence of the actuating member on the respective pumps. This is, of course, the position of greatest sensitivity since full stroking of the pumps is effected by full movement of the pedals in their respective directions. As can be seen in FIG. 8, for example, when the extending sector 155 moves upwardly to the uppermost position, shown by dashed lines 177, the rod will have been moved to its upper position, shown by dashed lines 179 for full movement of the rod 163 in correspondence with pedal movement. Conversely, at an intermediate position designated 181, only mid, or medium sensitivity and medium movement of the actuating member is made responsive to full movement of the respective pedals.

In the illustrated embodiment, the operators control lever 97 may be moved to seven discrete detents, or positions, and held there by a suitable detents on the control quadrant 183, FIG. 4. The seven positions are equivalent to cumulative increments of about one mile per hour each in normal operation. Expressed otherwise, in the full position, the vehicle will travel about seven miles per hour in four wheel operation. Where it is desired to exceed this speed, as for running on a smooth surface like a road, the road speed control 107 may be pulled out to more than double the speed of the vehicle, since all of the hydraulic fluid is now fed to only one set of wheel motors, such as the rear set.

In operation, the hydrostatic system and respective controls are connected as illustrated and described hereinbefore. The operator then sets the operators control lever for the desired sensitivity. For example, for high speed operation, the operator may wish to use the entire angular movement of the actuating member on the pumps 41, 45. In the illustrated embodiment, this is 18° angular movement on the pump shaft. In normal operating of apparatus such as a loader, the operator may wish to only employ 8° or 9°, so he can set the operators control shaft at a setting of three or four. In many difficultly operable circumstances, he may wish to operate with high power and low speed such that he will use only 3° or 4° of angular movement. Consequently he may set the operators control lever at only position 1 or 2. Any degree of movement of the actuating member more than required wastes horsepower that otherwise can be used for steering machine or the like. Expressed otherwise, the operator can select the gear that he wishes to run in, if analogized to a transmission. This allows the engine to run at a constant, governed speed yet the machine, or vehicle, operation is controlled sensitively by the respective control valves or pedals.

As indicated hereinbefore, if the operator wishes to operate at road speeds, he pulls the road speed control 107 to send all of the motive hydraulic fluid to the rear wheels in the illustrated embodiment. Accordingly, it can be seen that the road speed controls and respective road speed control valve serve as a sort of overdrive that further increases the sensitivity of the speed of operation of the vehicle and allows it to be operated more rapidly at the same degree of movement of the pedals 117, 119.

One advantage of this invention is that the respective elements of the machines and controls are conventional and no exotic new materials are required.

From the foregoing, it can be seen that this invention provides the objects delineated hereinbefore and alleviates the deficiencies of the prior art in providing a vehicle in which the operator can control sensitivity of the control achieved with a particular degree of pedal movement.

Although the invention has been described with a certain degree of particularity, it is understood that the present disclosure is made only by way of example and that numerous changes in the details of construction and the combination and arrangement of parts may be resorted to without departing from the spirit and the scope of the invention, a reference for the latter being had to the appended claims.

What is claimed is:

1. In a hydrostatic system for at least one variable displacement pump having an actuating member movable in two directions for varying displacement in at least forward and reverse directions of travel of a vehicle; a hydraulically actuatable device operable by fluid from said pump; a hydraulic reservoir; serially interconnecting supply and return lines; the improvement comprising:
   a. at least one operator control member movable in two directions for moving said actuating member in its respective directions responsive to an operator; said operator control member being connected with said actuating member; and
   b. a sensitivity control means for setting a predetermined sensitivity of control of said operator control member; said sensitivity control means being operable from minimum to maximum in a given direction; said sensitivity control means being operatively connected intermediate said actuating member and said operator control member such that said sensitivity control means is adjustably positionable to one of a plurality of positions to control the amount said actuating member is moved by full movement of said operator control member.

2. The hydrostatic system of claim 1 wherein said hydrostatic system is employed for motive power on a vehicle and said hydraulically actuatable device comprises a plurality of hydrostatic hydraulic motors drivingly connected with respective wheels on said vehicle.

3. The system of claim 2 wherein said operator control member comprises two pedals, one for forward operation and one for rearward operation; said motors for said wheels are operable in two directions equivalent to front and rear directions; there are two respective high pressure fluid lines, one for each respective direction connected intermediate said at least one pump and said respective motors; and said sensitivity control means comprises a single sensitivity control member that operatively controls the amount said actuating member is moved by full movement of either pedal for their respective direction.

4. The system of claim 3 wherein said pedals are connected with a single stroking member on each pump in its neutral position such that only one pedal can be depressed at a time.

5. The system of claim 4 wherein said pedals are pivotally mounted and are movable downwardly and upwardly from a neutral position; there is provided an operating shaft; said pedals are connected with said operating shaft so as to effect pivotal rotation of said operating shaft in respective directions responsive to respective downward movement of a respective pedal from the neutral position; said operating shaft is connected with a lever means for transferring pivotal movement into linear movement; a connecting linear member is connected with said stroking member on each said pump and slidably connected at an interconnection joint with said lever means such that the effective moment arm from said operating shaft is variable from zero to maximum; said sensitivity control means includes linkage means connected with said sensitivity control member and operably connected with said interconnection joint so as to move the interconnection joint longitudinally of said lever means from zero to maximum.

6. In a hydrostatic system for at least one variable displacement pump having an actuating member movable in two directions for varying displacement in at least forward and reverse directions; a hydraulically actuatable device operable by fluid from said pump; a hydraulic reservoir; serially interconnecting supply and return lines; the improvement comprising:
   having said hydrostatic system employed for motive power on a vehicle and having said hydraulically actuatable device comprising a plurality of hydrostatic hydraulic motors drivingly connected with respective wheels on said vehicle; said at least one pump being connected with two sets of respective front and rear wheel motors; a road speed valve that is movable to divert one half of high pressure hydraulic fluid output to each of said front and rear wheel motors and to divert, in a roadspeed position, all of said high pressure hydraulic fluid to only one set of said front and rear motors for high speed road operation;
   a. at least operator control member movable in two directions for moving said actuating member in its respective directions responsive to an operator; said operator control member being connected with said actuating member; and
   b. a sensitivity control means for setting a predetermined sensitivity of control of said operator control member; said sensitivity control means being operatively connected intermediate said actuated member and said operator control member such that said sensitivity control means is adjustably positionable to one of a plurality of positions to control the amount said actuating member is moved by full movement of said operator control member.

* * * * *